United States Patent Office 2,853,316
Patented Sept. 23, 1958

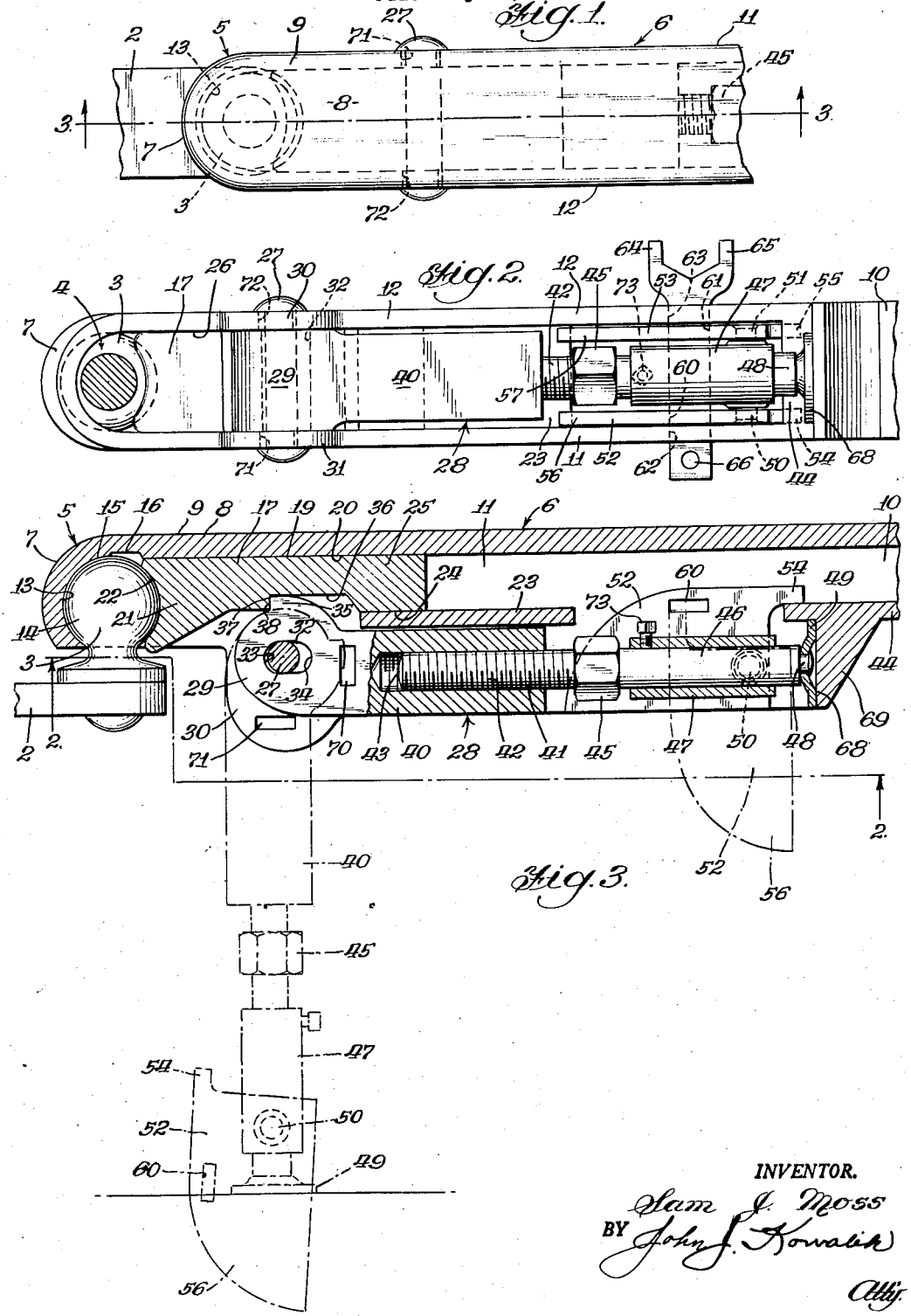

2,853,316

COMBINATION TRAILER HITCH AND JACK STAND

Sam J. Moss, Memphis, Tenn.

Application May 28, 1956, Serial No. 587,884

16 Claims. (Cl. 280—475)

This invention relates to hitches and more specifically to an improved tractor-trailer hitch.

A general object of the invention is to provide a novel hitch which is of rugged, simple and efficient construction and wherein the parts fold to provide a compact, self-contained structure protected from road dirt and inclemency of the weather.

The invention contemplates a hitch which incorporates common mechanism adapted to be disposed in one position to support the drawbar when detached from the towing vehicle and in another position functioning as an operative part of the coupling mechanism when the vehicles are hitched.

A more specific object of the invention is to provide a combination jack and coupler adjusting link which is swingable to a dependent position from the drawbar for supporting it when the associated trailer is parked.

A still further object is to provide a novel anti-theft device operative to hold the assembly in coupling relationship in one position and in parking relation in another position.

Another object is to arrange the parts so that the jack in coupling position of the mechanism is adapted to adjust the jaws of the coupler herein shown as a ball socket to take up for wear or accommodate different ball sizes thus adapting the coupler to universal application.

These and other objects of the invention will become more apparent from the specification and the drawings, wherein:

Figure 1 is a top plan view of the coupler shown in association with the draft member within which it is mounted.

Figure 2 is a bottom plan view of the mechanism partly in section on line 2—2 of Figure 3.

Figure 3 is a longitudinal sectional view on line 3—3 of Figure 1 showing the parts in coupled transport position in full line and in parking position in phantom lines.

Describing the invention in detail, and having particular reference to the drawings, there is shown a drawbar 2 preferably attached to a tractive vehicle (not shown) as will be readily understood by those skilled in the art, and mounting an upwardly extending ball 3.

The ball 3 is receivable in a socket 4 of a coupler generally designated 5 at the forward end of a draft member or tongue 6 of the drawn or trailing vehicle (not shown).

The coupler stationary jaw or socket portion 7 is formed as a downwardly curved forwardly convexed front wall which is a continuation of the upper wall 8 of the inverted U or channel shaped forward or leading end portion 9 of the draft beam 6. It will be understood that although the forward end portion is shown as integral with a box-section rear end portion 10 of the tongue, it may be made as a separate structure and secured to the tongue in any convenient manner. The forward portion 9 in addition to the forward and top walls 7 and 8 has a pair of integral laterally spaced side walls 11 and 12 depending from the lateral margins of the top wall 8 and merging at their forward extremities with the lateral edges of the front wall 7.

The front wall 7 provides an internal spherical or arcuate bearing surface 13 which mates with a preferably complementary spherical external surface 14 of the ball 3 and pocketing the forward portion thereof. The surface 13 continues for a short distance onto the bottom side of the forward extremity of the top wall 8 to provide a bearing at 15 for the top of the ball and immediately rearwardly of this area the bottom side of the top wall in the region directly over the ball is relieved to provide a cavity 16 into which may be packed grease, if desired. However, a further function of this relief is to prevent the development of a shoulder due to movement of the movable rear jaw or socket member 17 which is slidable longitudinally of the draft member.

As best seen in Figure 3 the rear coupling element 17 comprises a block which fits beneath the top web 8 and between the side walls 11 and 12 in guided engagement therewith and the block has its top side 19 slidably engaging the bottom side 20 of the top wall of the enclosing casing as constituted by the forward end portion 9 of the draft beam. It will be seen that as the movable clamp member 17 moves back and forth wear takes place between 19 and 20. The forward end 21 of the block 17 is provided with an arcuate or spherical concave surface 22 which is adapted to pocket the rear side of the ball. The coupling member or jaw 17 is retained in the housing by a supporting wall 23 which engages with a bottom side 24 formed on the rear portion 25 of the coupling member 17. This structure prevents the movable jaw 17 from dropping out of the open bottom 26 of the housing 9.

The actuating or operating mechanism for the movable coupling member 17 comprises an extensible and retractible jack generally designated 28 so formed and arranged that in its upright or parking position it supports the tongue and coupler at desired height and unlocks the coupler and in its folded or transport position it serves to adjust the movable coupling member 17 so that it and the stationary coupling member 7 properly embrace the ball 3 therebetween to prevent its escape downwardly from between the same because of its size or because of wear.

The combination jack and adjusting linkage comprises a head portion 29 which extends between a pair of lugs or ears 30 and 31 depending from and preferably integral with the side walls 11 and 12 of the housing and located in an area intermediate the ends of the movable coupler element 17 beneath which is disposed the head 29 which is pivoted on a substantially horizontal pin 27, said pin extending through registering apertures in the ears 30 and 31 and through a slot 32 in the head 29. It will be seen that the slot 32 is elongated lengthwise of the jack for a purpose hereinafter described and has arcuate extremities 33 and 34 to accommodate vertical swinging of the structure 28. The head is provided with a radially outwardly extending lug 35 which is disposed rearwardly of the axis of pivot of the assembly 28 when it is in upright parking position and which is swung upward into a notch 36 in the underside of the coupling member 17 intermediate its ends and behind an opposing lug 37 formed on the member 17 and with which the lug 35 engages as shown at 38 Figure 3 and coincidentally pushing the member 17 forwardly against the ball thereby clamping it with the member 7.

The jack includes a barrel or body portion 40 on one end of which the before-mentioned head 29 is formed. A threaded bore 41 extends into the barrel from its other end and threadedly engages a threaded end 42 of a bolt or male member 43 which intermediate its ends is provided with a wrench engaging nut-like hexagonal or octagonal part 45. The other end 46 of the member 43 is preferably cylindrical and extends through a sleeve 47 and at its distal end 48 is rotatably secured to a base 49.

The sleeve 47 is provided at its end adjacent the base 49 with outwardly extending diametrically opposite coaxial pins 50 and 51 on which are secured and pivoted a pair of latches 52 and 53 which flank the sleeve 47 and in the transport position of the device as seen in Figure 3 enter between the walls 11 and 12 of the housing in paralleling relationship therewith attendant to the latches being swung upwardly about the trunnions 50 and 51. It will be observed that the latches 52 and 53 are provided at corresponding ends with lugs 54 and 55 respectively which in the transport position overlap the bottom wall 44 of the box section portion of the hitch beam 6 while the other ends 56 and 57 embrace the nut part 45 preventing rotation of the bolt 43. At the same time the intermediate portions of the latches 52 and 53 horizontally align the slots 60 and 61 therein with slots 62 and 63 in the walls 11 and 12 to receive a locking bolt 64 therethrough as shown in Figure 2. The bolt 64 has a widened end portion 65 at one end and an aperture 66 at its other end for receiving a lock whereby the bolt is prevented from being removed and in combination with the latches serves as an anti-theft means.

It will be noted that in the folded or transport position of the mechanism as seen in Figure 3 the base 49 of the jack sits as at 68 against a depending ledge or abutment 69 formed on the wall 44 of the draft beam. In this transport position and before the latches are moved upwardly from that shown in dotted lines in Figure 3, if there is any looseness in the jaws clamping the ball, the screw is rotated to extend the jack, the extension movement being accommodated by the elongation of the slot 32 whereby the barrel is moved forwardly moving the jaw 17 through the lugs 35, 37.

The assembly is shown in parking position in phantom (Figure 3) and it will be noted that the lug 35 is swung away from the lug 37 accommodating rearward movement of the rear jaw member 17 to uncouple the ball.

The element 40 is provided with a slot 70 which aligns with slots 71 and 72 in the ears 30 and 31 for admitting the bolt 64. The latches may be swung to dig into the ground to provide anchors and their position may be adjusted or held relative to the bolt by a set screw 73 threaded through the sleeve 47 and engaging the bolt.

It will be appreciated by those skilled in the art that a simple and effective novel combination support and coupler has been provided wherein the support stand serves as a lever in coupling the jaw members with the ball and its adjustability serves not only to park the unit at a desired height and to facilitate uncoupling by jacking the tongue of the trailed vehicle off the ball but the jack also serves as an adjustment for the jaws. Furthermore there is provided a novel anti-theft device which also functions to hold the assembly in transport position.

It is to be understood that I do not wish to be restricted to the precise details of the invention herein disclosed but that other equivalent structures will readily suggest themselves to those skilled in the art as set forth and covered in the appended claims.

Furthermore, it will be observed that the end 65 of the bolt 64 may be formed as a wrench to fit the nut 45.

I claim:

1. The combination of a vehicular draft frame, coupling means thereon including a pair of relatively movable coupling members defining a socket therebetween for reception of an associated coupling part, a combination support and operating assembly having a first position supporting said frame and releasing said coupling means and a second position closing said coupling means and said assembly comprising a pair of threadedly engaged elements, one of said elements disposed in abutting relation to said frame and the other to at least one of said coupling members in said second position of the assembly.

2. The combination of a vehicular draft frame, coupling means thereon including a pair of relatively movable coupling members defining a socket therebetween for reception of an associated coupling part, a combination support and operating assembly having a first position supporting said frame and releasing said coupling means and a second position closing said coupling means and said assembly having one end slidably and pivotally connected to the frame for vertical swinging movement between said first and second positions and translational movement with respect to the frame, and cooperative means on said one end of said assembly and one of said coupling members inter-engageable attendant to upward swinging of said assembly from the first to said second position for urging said one coupling member toward the other said assembly having parts translationally movable within the limits of said connection of the assembly with the frame for adjusting the position of said one coupling member relative to the other when said assembly is in said second position thereof.

3. The combination of a housing having a top wall and a pair of integral laterally spaced side walls depending from opposite edges of said top wall, a stationary coupling member comprising an end wall depending from the top wall and merging into said side walls and defining therewith a concave socket portion facing into the housing, a coupling element movably supported within said housing and having a concave socket portion disposed in opposing relation to said first-mentioned socket portion and movable toward and away therefrom for coupling and releasing an associated coupler ball entered therebetween, an extensible and retractible structure reactively disposed between said element and an opposing portion of said housing and adapted upon extension to move said element toward said member, and combination anti-theft and anchor means supported on the housing and disposed in operation preventing relation to said structure in one position thereof.

4. The combination of a housing having a top wall and a pair of integral laterally spaced side walls depending from opposite edges of said top wall, a stationary coupling member comprising an end wall depending from the top wall and merging into said side walls and defining therewith a concave socket portion facing into the housing, a coupling element movably supported within said housing and having a concave socket portion disposed in opposing relation to said first-mentioned socket portion and movable toward and away therefrom for coupling and releasing an associated coupler ball entered therebetween, an extensible and retractible structure reactively disposed between said element and an opposing portion of said housing and adapted upon extension to move said element toward said member, and anti-theft means supported on the housing and disposed in operation preventing relation to said structure, and said structure comprising a screw assembly including a wrench engaging portion and said anti-theft means comprising a member movably mounted on said assembly in obstructing relation to turning of said wrench-engaging means with said assembly, and a bolt carried by the housing and extending through an aperture in said member and means locking said bolt to said housing.

5. The combination of a vehicle draft tongue comprising a top wall terminating in a depending forward end wall providing an inwardly facing socket portion and a pair of integral side walls, a coupling element movably supported within the housing for translation to and fro with respect to said socket portion and having a socket opposing said portion for receiving an associated coupling member therewith, and means disposed in actuating relationship to said element for moving the same and including elongated structure having a first position dependent from said tongue for supporting the same from the ground, and having a second position displaced from the first and operative upon movement thereof from said first to said second position to move said coupling element into coupling position with said socket portion about said member and upon movement from said second to said first position to release said coupling element for movement to uncoupling position, said structure adjustable lengthwise, and an abutment on said tongue disposed in opposing spaced relation to said coupling element, said structure in said second position thereof disposed between said abutment and said element and adjustable to urge said coupling element into tight engagement with the associated coupling member.

6. The combination of a vehicular draft structure, a coupling member on the structure and having a socket part, a coupling element supported on the structure for translatory movement toward and away with respect to said coupling member and having a socket opposing said socket part, and means having a leverage arrangement with said element for moving the same, said means including an elongated assembly having a first position supporting said structure and a second position displaced from the first and operative attendant to such displacement to actuate said element, and said assembly comprising a portion having a slot elongated lengthwise of the assembly, a pivot pin connected to said structure and extending through said slot, said portion and element having cooperative thrust abutments engageable in said second position of said assembly.

7. The combination of a vehicular draft structure, a coupling member on the structure and having a socket part, a coupling element supported on the structure for translatory movement toward and away with respect to said coupling member and having a socket opposing said socket part, and means having a leverage arrangement with said element for moving the same, said means including an elongated assembly having a first position supporting said structure and a second position displaced from the first and operative attendant to such displacement to actuate said element, and said assembly including telescopingly arranged portions adjustably associated for extending and contracting the same, and in said first position functioning to adjust the elevation of said structure and in said second position reactively disposed between said structure and said element for incrementally adjusting the position of the element.

8. The combination with a vehicular structure, of a coupler carried thereby including a stationary part and a movable part, a jack assembly pivotally connected at one end of said draft structure on a generally horizontal axis and comprising a radial lug, and a lug on said movable part disposed in the path of movement of said lug on the jack assembly for movement thereby of said movable part to coupling position attendant to said assembly being swung upwardly from a dependent position relative to said structure, and said assembly including telescoping sections adjustably interconnected for elongating and contracting said assembly, and said pivotal connection including a slot in one of said sections elongated lengthwise of said jack assembly, and abutment means on the draft structure for engaging the opposite end of the jack assembly upon the same being swung upwardly whereby said assembly is adapted to incrementally move said movable coupler part in coupling direction.

9. The combination with a vehicular structure, of a coupler carried thereby and including a plurality of relatively movable parts positionable in adjacent relation for coupling with an associated coupler element and in separated relation for uncoupling with respect thereto, a combined jack and lever structure pivotally supported from said vehicular structure at one end and having an opposite base end, said combined structure adapted to be vertically disposed with the base end upon the ground for supporting said vehicular structure, said combined structure adapted to be swung upwardly into transport position between one of said parts and a portion of said vehicular structure, said pivotal connection including a slot in one of said structures elongated in the direction of coupling movement of said one part and said combined structure being longitudinally adjustable between said one part and said portion of said vehicular structure for incrementally urging said one part in coupling direction.

10. In a coupling device, a housing including a top wall and side walls, a stationary coupler connected to said housing and presenting a socket facing into the housing, a movable coupling element supported in the housing for movement toward and away from said coupler, an operating linkage connected between said element and an opposed portion of the housing for moving the element as aforesaid, said linkage including threaded parts, a wrench engaging portion on one of said parts presenting at least one flat face, a latch swingably suspended from said linkage and adapted to be telescoped into the housing along a side wall thereof athwart said face to prevent rotation of said one part, and means on said housing and latch releasably interlocking the same.

11. In a device of the class described, a frame, a jack assembly swingably connected at one end to said frame, said assembly positionable upright in supporting relation to the frame and swingable upwardly against the frame in transport, latching means pivoted to said jack and in said transport disposition of the jack swingable to a position aligning a slot therein with a slot in the frame for reception of an associated locking means, said latching means in the upright position of the assembly swingable into the ground for anchoring said jack assembly.

12. A coupler comprising a support, a pair of relatively movable members carried thereby, means for operating one of said members including a lever swingably supported from the support and having one end formed and arranged to engage said one member for moving the same attendant to swinging of the lever, and said lever positionable in parallel to the movement of said one member, and including a plurality of parts adjustably interrelated for extending and contracting the lever in said position thereof, and means operatively connecting the lever in said position to said support.

13. A coupling including a support, a stationary coupling element and a movable coupling element disposed in opposing cooperative relation on the support, said movable element including an elongated block having a notched downwardly facing intermediate part, a jack having one end swingably suspended from the support beneath said intermediate part and having a radial lug swingable into said notched part as said jack is swung upwardly, and a dependent lug on said intermediate part disposed in the path of movement of the lug on the jack.

14. A coupling comprising a ball, a draft frame, a pair of opposed relatively movable socket members on the frame, and a longitudinally adjustable mechanism operatively associated with one of said members and having a generally horizontal transport position and a substantially upright parking position, abutment means on said frame for holding said mechanism in transport position and providing a reaction point for the mechanism from which it is adjustable, said mechanism operative in said transport position to move at least one of the members relative to the other to embrace the ball and in parking position to vary the elevation of said draft frame.

15. A coupling including a support, a stationary coupling element and a moveable coupling element disposed in opposing cooperative relation on the support, said moveable element including an elongated block having a notched downwardly facing intermediate part, a jack having one end swingably suspended from the support beneath said intermediate part and having a radial lug swingable into the notched part as said jack is swung upwardly, a dependent lug on said intermediate part disposed in the path of movement of the lug on the jack, means on the support providing a vertical seat for the opposite end of the jack, and means for locking said jack against the support and comprising a catch on the support and a latch pivoted on the jack on an axis transverse thereto and swingable into latching engagement with said catch.

16. The combination of a draft frame, a pair of opposed coupling elements thereon, one of said elements movable generally horizontally with respect to the other into coupling and uncoupling positions, a combination operating and support structure, generally horizontal pivot means on the frame beneath said one element extending through a slot in one end of said structure, the slot elongated lengthwise of the structure whereby said structure is movable lengthwise and swingable vertically to an upright position for supporting the frame from the ground and a generally horizontal position beneath said frame, said structure having latching means engageable with said frame for supporting the structure in said generally horizontal position, said latching means and frame having transverse slots alignable in said horizontal position of the structure, a key insertable into said last-mentioned slots for locking said latching means to said frame, said structure and frame having other transverse slots alignable in the upright position of the structure and said key insertable in said last-mentioned slots for locking said structure in said upright position, said structure adjustable in its upright position while locked to the structure to adjust the elevation of the frame and in its horizontal position while said latching means is unlocked to adjust said structure to move said one coupling element and said latching means in its locked position obstructing adjustment of said structure.

References Cited in the file of this patent

UNITED STATES PATENTS

| | | |
|---|---|---|
| 1,167,792 | Byron | Jan. 11, 1916 |
| 2,130,100 | Rasmussen | Sept. 13, 1938 |
| 2,305,704 | Heinmiller | Dec. 22, 1942 |
| 2,397,001 | Goodwin | Mar. 19, 1946 |
| 2,631,862 | Johnson | Mar. 17, 1953 |

FOREIGN PATENTS

| | | |
|---|---|---|
| 753,989 | France | Oct. 28, 1933 |
| 649,571 | Germany | Aug. 27, 1937 |